(12) United States Patent
McCormack et al.

(10) Patent No.: US 8,934,477 B2
(45) Date of Patent: Jan. 13, 2015

(54) ROUTING OF WEB-BASED CONTACTS

(75) Inventors: Tony McCormack, Galway (IE); Paul D'Arcy, Galway (IE); Patrick Hession, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 1128 days.

(21) Appl. No.: 12/417,334

(22) Filed: Apr. 2, 2009

(65) Prior Publication Data

US 2009/0210524 A1    Aug. 20, 2009

Related U.S. Application Data

(63) Continuation of application No. 10/323,410, filed on Dec. 18, 2002, now abandoned.

(51) Int. Cl.
| | | |
|---|---|---|
| H04L 12/66 | (2006.01) | |
| H04L 29/06 | (2006.01) | |
| H04L 29/12 | (2006.01) | |
| H04L 29/08 | (2006.01) | |
| H04M 3/51 | (2006.01) | |
| H04M 7/00 | (2006.01) | |

(52) U.S. Cl.
CPC ...... *H04L 29/12594* (2013.01); *H04L 65/1006* (2013.01); *H04L 29/12047* (2013.01); *H04L 65/1069* (2013.01); *H04L 67/02* (2013.01); *H04M 3/51* (2013.01); *H04L 61/15* (2013.01); *H04L 67/2842* (2013.01); *H04L 29/06027* (2013.01); *H04L 61/307* (2013.01); *H04L 65/4007* (2013.01); *H04L 29/12009* (2013.01); *H04L 67/2814* (2013.01); *H04M 7/006* (2013.01)
USPC ............... 370/352; 379/265.1; 379/265.11

(58) Field of Classification Search
USPC ................ 379/265.01–266.1, 365.01–266.1; 370/352
See application file for complete search history.

(56) References Cited

U.S. PATENT DOCUMENTS

| | | | | |
|---|---|---|---|---|
| 5,754,639 | A * | 5/1998 | Flockhart et al. | ........ 379/266.05 |
| 5,926,538 | A * | 7/1999 | Deryugin et al. | ........ 379/265.03 |
| 6,046,762 | A * | 4/2000 | Sonesh et al. | ............. 348/14.11 |
| 6,130,933 | A * | 10/2000 | Miloslavsky | .............. 379/90.01 |
| 6,141,413 | A * | 10/2000 | Waldner et al. | ............ 379/88.17 |
| 6,366,575 | B1 * | 4/2002 | Barkan et al. | ................. 370/352 |
| 6,523,010 | B2 * | 2/2003 | Lauffer | ........................ 705/7.14 |

(Continued)

OTHER PUBLICATIONS

Voice Over IP, by Uyless Black, Prentice-Hall, Jun. 2000.*

*Primary Examiner* — Simon Sing
(74) *Attorney, Agent, or Firm* — Barnes & Thornburg LLP

(57) ABSTRACT

A method of providing access to a network of contact centers comprises providing contact links on one or more web pages which when activated initiate contacts to the contact centers. The network addresses associated with the links and to which the contacts are automatically directed are dynamically specified in the web pages and are obtained from a database. The database is dynamically updated in response to statistical updates received periodically or continually from the individual contact centers. In this way the contacts can be directed in advance to the most appropriate destination without having to evaluate each contact as it enters the contact center network, thereby reducing processing time and delays. Alternatively one or more remote session initiation protocol (SIP) proxy servers can be updated periodically with network addresses from the database, whereby SIP requests are directed by the proxy server to the contact center or agent most suitable to handle the contact, as determined in advance of the request from the statistical information.

24 Claims, 8 Drawing Sheets

(56) References Cited

U.S. PATENT DOCUMENTS

| | | | |
|---|---|---|---|
| 6,567,848 B1 * | 5/2003 | Kusuda et al. | 709/219 |
| 6,678,718 B1 * | 1/2004 | Khouri et al. | 709/204 |
| 6,970,829 B1 * | 11/2005 | Leamon | 705/7.14 |
| 6,980,311 B1 * | 12/2005 | Currans et al. | 358/1.15 |
| 7,027,585 B2 * | 4/2006 | Dezonno | 379/265.09 |
| 7,116,682 B1 * | 10/2006 | Waclawsky et al. | 370/468 |
| 7,212,625 B1 * | 5/2007 | McKenna et al. | 379/266.01 |

* cited by examiner

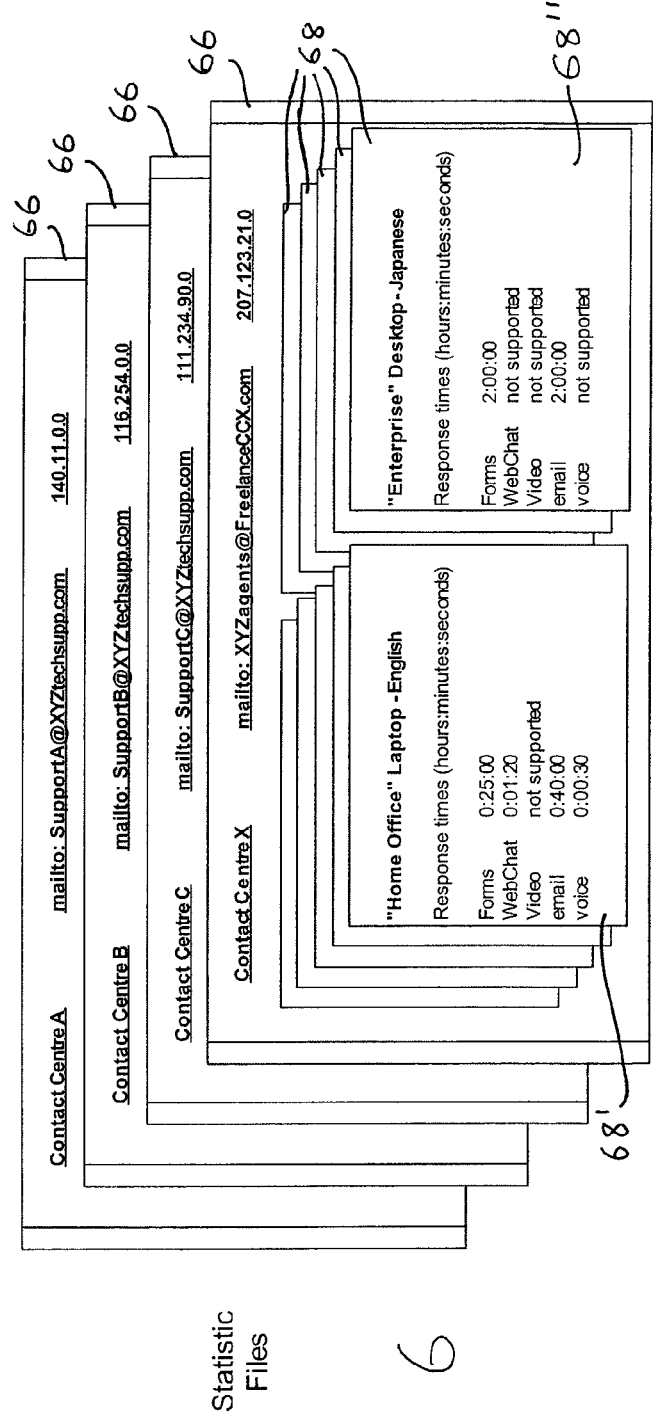

ROUTING OF WEB-BASED CONTACTS

RELATED APPLICATION

This application is a continuation of U.S. patent application Ser. No. 10/323,410 filed Sep. 18, 2002, now abandoned.

FIELD OF THE INVENTION

The present invention relates to methods and apparatus for managing contact centres in a network. The invention has particular application in managing call centres connected by a data network such as the Internet or a Wide Area Network (WAN).

BACKGROUND OF THE INVENTION

Contact centres are widely used to allow an enterprise or business to efficiently handle customer enquiries, complaints and support, and to allow an enterprise to make contact with existing or potential customers.

A widely recognised difficulty exists when contact centres cannot efficiently handle the volume of calls at any given time. (The term "calls" here is not intended to denote solely voice telephony calls as many contact centres provide multimedia communication between agents of the centre and customers or remote users, so that "calls" is intended to encompass voice and video calls, Internet chat sessions, emails, short messaging service (SMS) messages and any other such communications between a remote user and an agent. Similarly, while the term "call centre" will be used interchangeably with "contact centre", it is to be understood that this is not a limitation on the type of contact centre to which the invention applies.)

A typical contact centre will have two main components, namely a network interface such as a switch or a private branch exchange (PBX) which handles the calls themselves, and a management component such as a contact centre server for controlling the operation of the PBX (the PBX and the management component can in fact be the same physical implementation) to direct calls to suitable agents. Thus, based on information gleaned from the call in its initial stages (e.g. from menu choices made in an interactive voice response (IVR) session), the contact centre server will determine a skillset which an agent would ideally require to handle the call. An agent is identified from those currently active at the centre, taking into account the number of calls currently on hold for that agent and other relevant data available to the contact centre server, and the PBX is directed to transfer the call to the directory number (DN) or the position ID of that agent by the contact centre server when the agent becomes free.

Nortel Networks provides a contact centre solution in which its Meridian PBX is associated with a Symposium Call Centre Server (SCCS). (Nortel, Meridian, Symposium and SCCS are trade marks.) The possibility currently exists to network a number of contact centres by providing an Internet (or other WAN) link between the respective SCCS units of different contact centres, and by providing telephony links (either dedicated ISDN (integrated services digital network) lines or links over the public switched telephone network (PSTN)) between the respective Meridian PBX units. A Networked Call Centre (NCC) server is also provided on the WAN to propagate to each SCCS the network address and routing tables for all of the other networked call centres.

Each SCCS unit therefore registers with the NCC server, and the NCC server defines and propagates the routing tables for each node to each other node. The NCC server then drops out of the process (though it may stay connected to the SCCS units to collect statistical information).

When a SCCS determines that it cannot efficiently handle a call to its associated PBX (either due to a lack of agents with the needed skillset, or to the centre being too busy), it may broadcast a message to each of the other SCCS units to determine if any other contact centre can take the call. If and when a response is received, the SCCS at the call centre to which the call was made instructs the Meridian PBX to transfer the call to the remote contact centre over the dedicated or public telephony link.

While this solution does allow a network of contact centres to make use of an overcapacity in one centre to relieve an overload at another centre, it is by no means an ideal solution. Among the problems with this solution are:

1. The first centre to reply will normally be allocated the call. Depending on the speed of network traffic between the remote centres, this node may simply receive the call because it is the first to reply, whereas a more suitable centre may be slower to respond and thus will not be allocated the call.

2. A remote centre may claim a contact to increase its turnover, but the call might be placed in a long queue after it is transferred to the remote centre, which leads to a worse overall service for the customer.

3. Conversely a contact centre might try to offload more than its fair share of calls, and transfer a call to a busier centre where the customer has a longer wait.

4. There is no way of telling which agent the call is to be transferred to, and the agent must be assigned to the Networked Skillset. If the originating centre is attempting to provide the best possible service to its own customers, it may therefore be reluctant to hand a call over to a remote centre.

U.S. Pat. No. 6,115,693 (McDonough et al., assigned to Andersen Consulting LLP) describes a virtual sales and service centre in which a plurality of call centres are connected to a "quality centre" which acts as a management point for all of the call centres. Calls are received centrally by the quality centre and then are distributed out to the individual call centres. In this system, all of the call centres are subordinate to the quality centre which tightly controls the operation of each centre. The intended result of this is that the network of call centres is presented as a unified resource to the customer.

U.S. Pat. No. 6,373,836 (Deruygin et al., assigned to Genesys Telecommunications Laboratories, Inc.) describes an IP telephony network centre which has a plurality of call centres managed by a central controller. The central controller accepts IP telephony calls and routes the calls to the call centres for distribution to agents of those centres. The call centres report statistical information to the central controller via a dedicated data link in such a way that in case of failure of a data link, the controller can still make educated guesses as to the status of the call centre.

In both the system of U.S. Pat. No. 6,115,693 and that of U.S. Pat. No. 6,373,836, the calls are centrally received and distributed. The individual call centres are tightly coupled to the central unit. While U.S. Pat. No. 6,373,836 contemplates the failure of a dedicated data link, neither system could function in the absence of the central unit, since this unit makes all of the decisions as to how calls should be routed.

Furthermore, because the networked centres are so tightly bound to the central unit, the systems are not designed to accommodate casual or freelance call centres being used to handle call overloads.

Cisco Systems provide a system called "Intelligent Contact Management" which is intended to manage and transfer contacts between different sites on a corporation. However, this product requires dedicated links between sites and is therefore unsuitable for use in integrating third-party or contract call centres into the network temporarily.

In busy contact centre networks, there may be, for example, 40,000 or more contacts received per hour. Whether these contacts are analysed and routed at the nodal (contact centre) level, or at the network management unit level, there is a significant processing overhead in analysing the contacts.

It is an object of the present invention to address the above disadvantages and provide a system and method of managing call centres which is more flexible in allowing calls to be transferred between independent contact centres than is the case in systems and methods known from the prior art.

SUMMARY OF THE INVENTION

The invention provides a method of routing contacts in a network of contact centres, the method including the steps of:
  a) providing at least one uniform resource indicator (URI) which is accessible by users of the contact centre network to initiate a contact to the contact centre network;
  b) maintaining a record of a network address to which the contact should be forwarded; and
  c) updating this record in accordance with information received from the contact centres.

In accordance with this method, individual contacts do not need to the analysed to determine the most appropriate address to which they should be sent as the activity of the respective contact centres varies. Instead, the URI (e.g. a web page link or an email address) provided to users of the contact centre network to initiate a specific type of contact (normally equating to a specific set of skills) is varied over time to point to the centre with the best availability for the skillset in question. By changing the properties of the links on a contact web page individual contacts do not need to be analysed as they arrive in the contact centre network.

The term "Uniform Resource Indicator" (or "URI") denotes an address or name of a resource on a network. It encompasses the familiar addressing schemes of hypertext transfer protocol (HTTP), file transfer protocol (FTP) and email, as well as emerging technologies such as session initiation protocol (SIP) which is at present envisaged within the telecommunications industry as the most promising basis for future internet telephony and multimedia conferencing services. It is an extensible technology: there are a number of existing addressing schemes, and more may be incorporated over time.

Preferably, the URI is a web-based link. Further, preferably, this link is provided on a web page. Alternatively, however, the link could be provided as a voice activated link within a voice recognition system.

Usually, the web page will include a number of links, each initiating a contact having individual characteristics to the network of contact centres when activated by a user.

For example, different links might generate contact in different media (telephone calls, emails, etc.), or they might generate contacts relating to different products or services, or they might be in different languages.

Preferably, the link is a dynamic link which is evaluated when the link is activated to determine the current properties of the record.

For example, the link may be evaluated using known technologies such as common gateway interface (CGI) scripts, application server pages (ASP) code, or Java™ server pages (JSP) code, or using other equivalent or improved technologies which may emerge to produce similar results.

Some examples of contact types and corresponding addresses are:
  the contact is an e-mail message, and said network address is an email address to which the email is sent.
  the contact is a voice over internet protocol (VoIP) call or an internet video call, and said address is an IP address to which the call is initially directed.
  the contact is a form, and said network address is an email address to which the contents of the form are sent.
  the contact is a web chat request, and said network address is an IP address to which said request is initially directed.

Preferably, step c) includes comparing a performance parameter received from a contact centre with a corresponding parameter currently in said record, and based on this comparison, updating the record according to a predetermined rule.

For example, in a preferred embodiment, the performance parameter is an expected response time, and the rule dictates updating the record if the expected response time received from the contact centre is lower than a currently recorded response time in the record.

In this way, the record can be continually updated with the address of the most responsive contact centre competent to deal with the contact of the type generated by the link. Almost any rule type can, however, be built into this system. Consider as an alternative a multi-lingual network of contact centres. It may be decided that the centre based in Japan should be responsible for all contacts from the Japanese language support page unless its response time is more than 50% worse than the response time of any other centre having the competency to deal with Japanese requests. If the Japanese centre reports a response time of 3 minutes for voice calls in Japanese and the only other centre with a competency in Japanese reports a response time of 2 minutes 30 seconds, then the contact link for voice calls in Japanese would continue to direct such calls to the Japanese centre (perhaps on the basis that the centre with the slightly faster response time might take, on average, longer to deal with the problem than a native speaker). The enterprise can write its own rules based on its own experience and goals, and the statistics information can be tailored to these rules.

Preferably, step c) involves receiving statistical information from a number of contact centres and updating the record with an address of a contact centre having optimum statistical information according to a predetermined rule.

Preferably, step b) involves maintaining a number of records each specifying an address of a contact centre to which one or more of the contact types is to be sent (e.g. one address for all Japanese communications, another for English calls for product A, a third for English calls for product B, etc.).

Further, preferably, step c) involves receiving information from a number of contact centres relating to the current status of each contact centre and updating the records with the addresses of the contact centres having the optimum status for receiving the respective contact types according to a predetermined rule.

Normally, a number of web pages is provided each having one or more links with individual characteristics, and step b) involves maintaining a number of records of contact centre addresses each associated with one or more of the links.

The record may be maintained in a cache in a proxy server remote from the contact centre and the step of updating said record is achieved by a server associated with the contact centre updating the proxy server.

The URI, in one described embodiment, is a session initiation protocol (SIP) URI. In such a case, the use of a proxy server is particularly useful.

In a further aspect the invention provides a method of managing a contact centre network including a number of contact centres communicating via a data network (such as the Internet) with a server which distributes contacts to the centres. This method includes the steps of:
  a) providing users of the contact centre network with access to the server to request that contacts of predetermined types be forwarded to the contact centre network;
  b) maintaining a record of a contact centre address to which a contact of each predetermined type should be forwarded; and
  c) updating this record in accordance with information received from the contact centres.

The method will preferably include the further step of each contact centre forwarding information regarding its current status to the server, and the server using the received information to update the record.

Suitably, the information may detail the expected response times of the contact centre to contacts of various types, and the server may maintain a number of records each containing a contact address for a different type of contact.

The invention additionally provides a method of managing a contact centre network including a number of agent stations each connected directly or indirectly to the Internet. This method includes the steps of:
  a) providing a contact centre network server with information relating to the activity of individual agent stations or groups of agent stations;
  b) maintaining a record of a contact centre address to which contacts of predetermined types should be forwarded;
  c) updating this record in accordance with information received from the agent stations (or groups thereof); and
  d) making the updated record available to one or more proxy servers on the Internet, whereby users accessing the contact centre network over the Internet via the proxy servers have their contacts automatically directed to an address specified in the record at the proxy server.

Preferably, the agent stations are each connected to one of a number of contact centre servers which in turn are connected to the Internet. It is possible, however, to have the agents connecting direct to the Internet. Where the agents connect via contact centre servers, these servers can provide the information to update the record, either in relation to individual agents or to groups of agents connecting to the servers.

The contact centre servers and proxy server(s) are preferably all session initiation protocol (SIP) servers.

The invention further provides a web server providing access to a network of contact centres via contact request links provided on a web page hosted by the server. The server has a web page store for storing said web page, an address store for storing addresses associated with the links and a processor for updating the address store in accordance with information received from the contact centres.

Preferably, the web page includes these contact request links as dynamic elements which are evaluated when the web page is requested, so that the addresses associated with the contact request links are retrieved from the address store at the time when the web page is requested. In this way, the best current address can be associated with the link, rather than a fixed address which can only be changed by changing the web page.

The invention further provides a session initiation protocol (SIP) proxy server providing access to a network of contact centres via a data network. The proxy server includes a cache for storing one or more Uniform Resource Indicators (URIs) each relating to a contact centre network address. It also includes a cache management unit for updating the cache in accordance with information made available by a management server of the contact centre network. In this way, contact requests received by the proxy server are resolved with reference to the cache to permit automatic direction to a network address determined in advance by the management server.

In another aspect the invention provides a contact centre network including a number of contact centres and a web server communicating with the contact centres via a data network accessible by users of the contact centres, in which:
  each contact centre includes:
    a) a number of agent stations adapted to receive and respond to contacts received via the data network;
    b) a contact centre management unit for managing the distribution of contacts to the agent stations; and
    c) a statistics processing unit for determining performance parameters of the contact centre as a whole and/or individual agent stations within the centre and for forwarding information derived from these parameters to the web server;
  and
  the web server includes:
    a) a page server unit for receiving web page requests from users of the contact centres and serving web pages to the users in response;
    b) a web page store for storing the web pages as dynamically evaluated code;
    c) a processing unit for dynamically evaluating the code when a web page request is received by the page server unit and returning to the page server unit the results of the evaluation, this evaluation including the determination of at least one network address associated with a link on the page;
    d) a memory accessible by the processing unit for storing the network address(es); and
    e) a memory management unit for maintaining and updating the network address(es) in the memory in accordance with the information received from the statistics processing units of the contact centres.

The invention also provides a contact centre network having a number of contact centres and a contact centre network server communicating with the contact centres via a data network, wherein:
  each contact centre includes:
    a) a number of agent stations adapted to receive and respond to contacts received via the data network; and
    b) a statistics processing unit for determining performance parameters of the contact centre as a whole and/or individual agent stations within the centre and for forwarding information derived from the parameters to the web server;
  and
  the contact centre network server includes:
    a) a memory for storing the at least one network address; and
    b) a memory management unit for maintaining and updating the at least one network address in the memory in accordance with the information received from the statistics processing units of the contact centres;
    c) a communications unit for making the at least one network address available to a remote proxy server connected to the data network, whereby the proxy server can cache the network address to automatically resolve a contact request relating to the contact centre network, to forward the contact directly to an address specified in advance by the contact centre network server.

The invention also provides a web page including at least one link to a network of contact centres. The link is specified as dynamically evaluated code and includes a reference to a stored network address to which a contact is initiated when the link is activated. The address is retrieved from storage when the web page is requested and can be overwritten in storage to point to whichever contact centre is best suited to receive the contact at the time the web page is requested.

In another aspect, the invention provides a computer program which when run in a web server does the following:
a) provides a web-based link accessible by users of the contact centre network, the link initiating a contact to the network of contact centres when activated by a user;
b) maintains a record of a contact centre network address to which the contact should be forwarded; and
c) updates the record in accordance with information received from the contact centres.

The invention also provides a contact centre having:
a) a number of agent stations adapted to receive and respond to contacts received from a web server via a data network;
b) a contact centre management unit for managing the distribution of contacts to the agent stations; and
c) a statistics processing unit for determining performance parameters of the contact centre as a whole and/or individual agent stations within the centre and for forwarding information derived from those parameters to the web server.

It is to be understood that references herein to a web server or a contact centre or any other entity whose functions can be distributed between a number of units should be understood as encompassing both a single unit and a distribution of units performing the same function.

BRIEF DESCRIPTION OF THE DRAWINGS

FIG. 6 is a diagram showing the contents of statistics records sent from a contact centre to the web server;
FIG. 7 is a diagram showing the contents of the network address database within the web server.

DETAILED DESCRIPTION OF PREFERRED EMBODIMENTS

Figure 1:
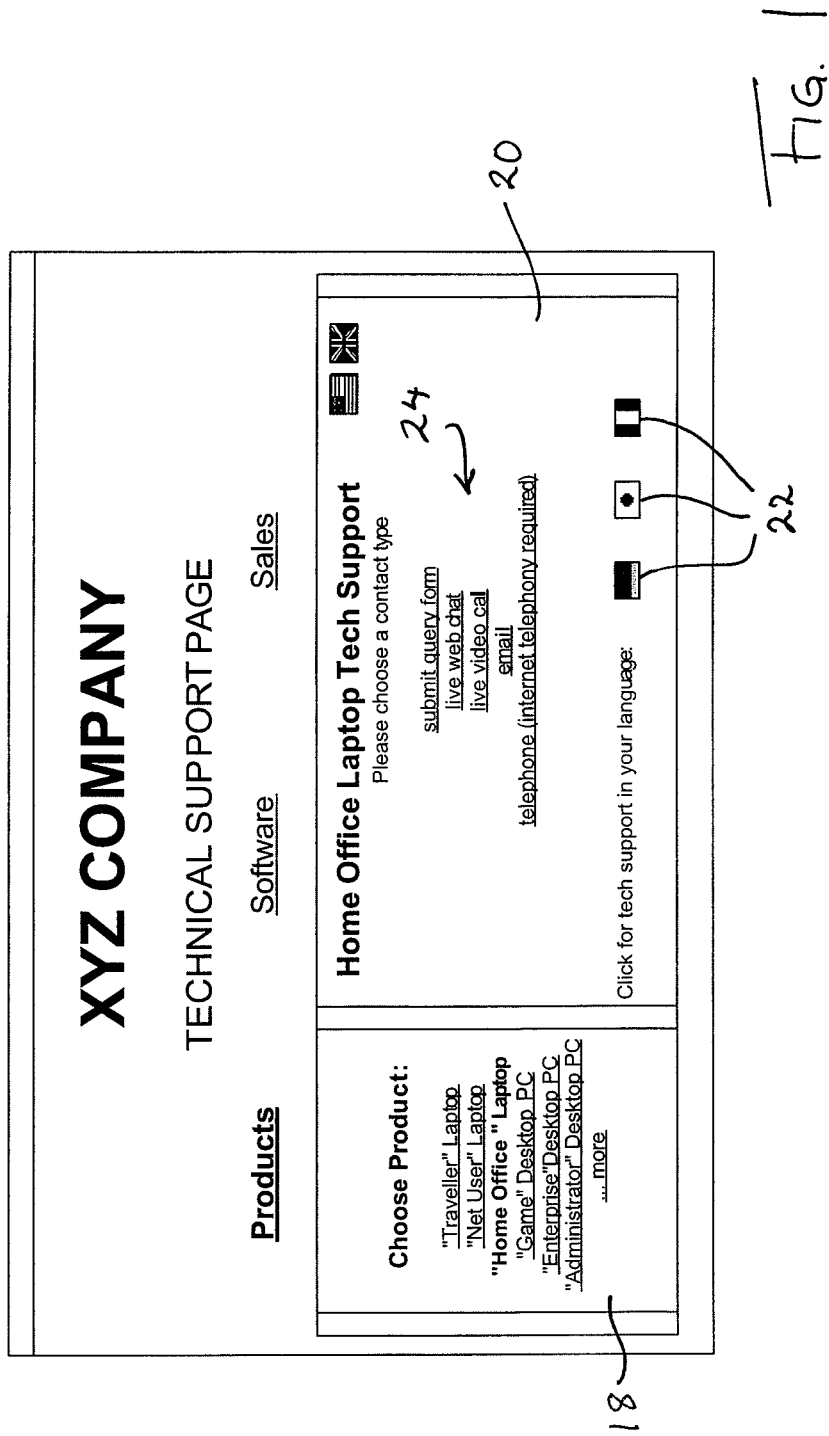
FIG. 1 shows a web page providing the ability to send contacts to a network of contact centres.
Figure 2:
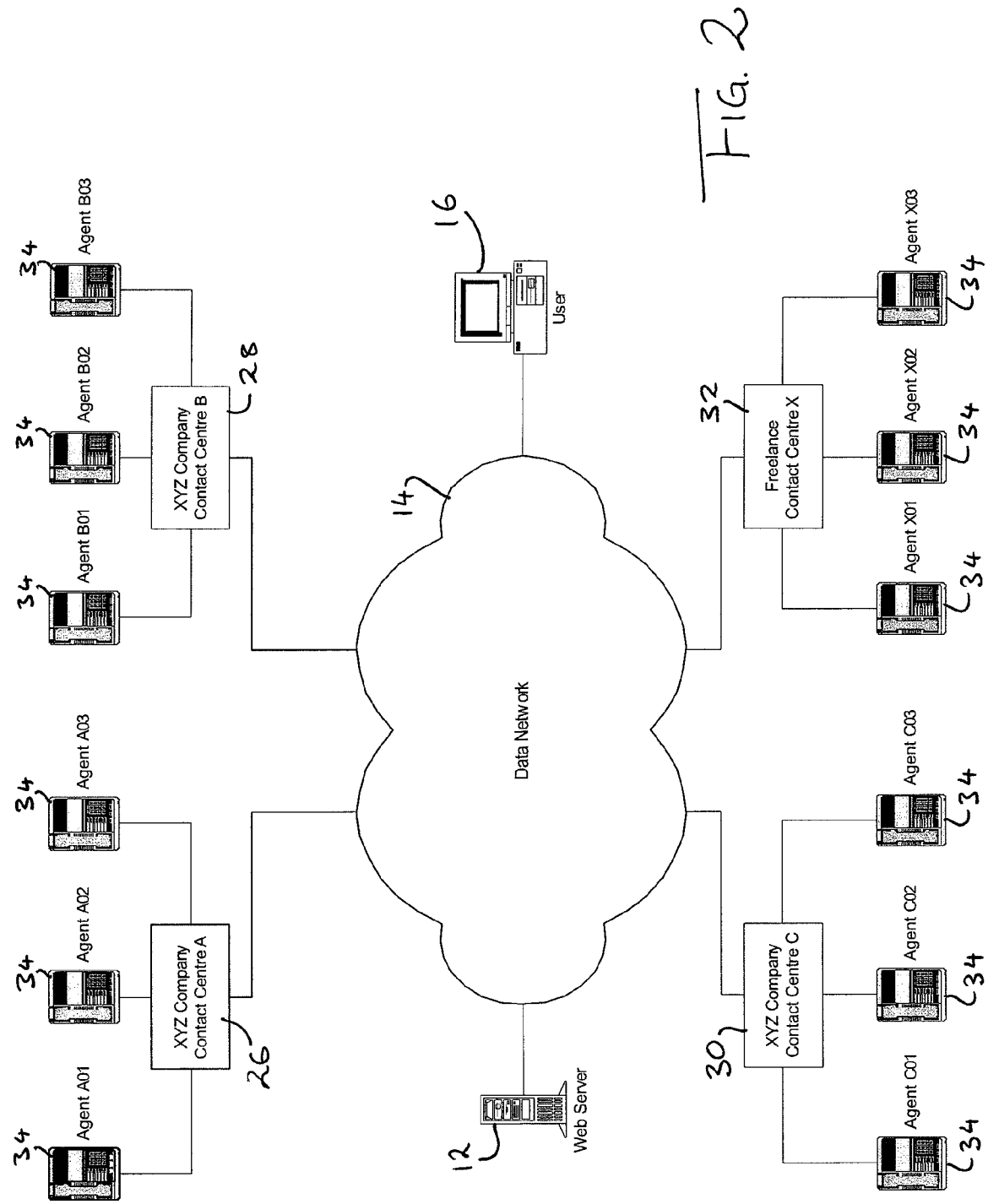
FIG. 2 shows the architecture of a network of contact centres.

FIG. 1 shows a simplified web page 10 of the type of often used to provide access by the customers of a company to the technical support services of the company. The technical support services in this scenario are provided by a number of contact centres in a network, as shown in FIG. 2.

The web page 10 of FIG. 1 is hosted on a web server 12 connected to a data network 14 which may be an intranet or the Internet. A user at a PC 16 accesses the web page 10 via the Internet using browser software on the PC in known fashion. Referring back to FIG. 1, it can be seen that the web page 10 has two frames 18,20. Frame 18 allows the user to choose a product of the company, and the selection of a product dictates the content appearing in frame 20. (Of course, the web pages need not relate to product technical support and can relate to any activity for which a contact centre is a useful route to deal with customers or users.

As shown in FIG. 1, the user has accessed the English language product support page for the "Home Office" laptop product. Icons 22 enable the user to access corresponding pages in German, Japanese or French. A series of links, indicated generally at 24, enable the user to initiate different contacts types, such as a query form, a web chat session, a video call, an email, or a telephone call from the user's PC. In this scenario, the video call and telephone call options require that the PC has appropriate software and hardware to initiate the respective contacts types.

In the prior art, a user initiating a contact such as a telephone call from a web page of this type would trigger a contact request which would be distributed within the network of contact centres by a network management unit. The network management unit would poll the contact centres in the network to determine the centre with the best availability for the skillset required to deal with the contact brackets based on language, contact type (telephone call) and subject matter (technical support for "Home Office" laptop), based on the agent activity in each centre. The contact would then be routed to the chosen contact centre and placed in a queue for an agent having the appropriate skillset to deal with the call.

Referring to FIG. 2, it can be seen that the company providing the web page has three dedicated contact centres 26, 28, 30 (called Contact Centres A, B and C, respectively) and employs freelance contact centre 32 (called Contact Centre X). Together, these contact centres form a network of contact centres. The number of centres and the identity of centres can change over time as individual contact centres become available or as demand increases and decreases. Each centre has a plurality of agents 34 available to deal with contacts from users.

Figure 3:
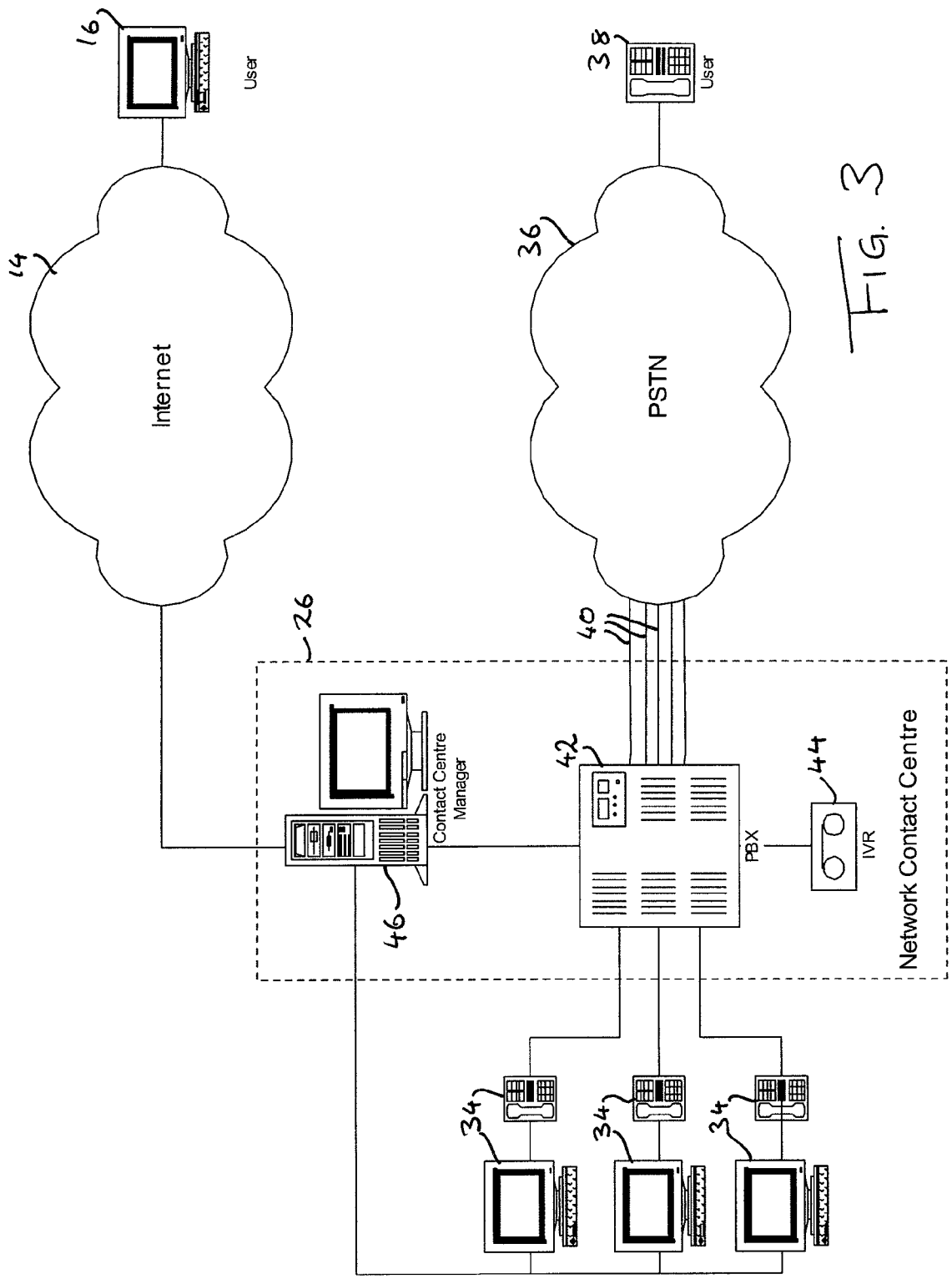
FIG. 3 shows the architecture of a contact centre.

FIG. 3 shows the architecture of a contact centre in more detail. The centre 26 connects to the Internet 14 (to which the user PC 16 is also connected). In addition, the centre 26 connects to the public switched telephone network (PSTN), allowing users to make conventional telephone calls from a telephone 38.

Conventional calls arrive over one of a number of dedicated telephone lines 40 to a private branch exchange (PBX) 42. Calls may be routed through an interactive voice response (IVR) unit 44 which prompts users through a series of menu choices in order to determine the nature of the inquiry, and hence the skillset required by an agent to deal with the contact. The call is then "held" in the PBX 42 and information regarding the call (such as the skillset determined in the IVR process, the line on which the call was received, and the caller line ID if available) is provided to a contact centre manager 46. The contact centre manager 46 operates a queue into which it places a token representing the terminated call. When the token reaches the top of the queue and a suitable agent is available to deal with the call, the contact centre manager 46 instructs the PBX to transfer the call to the agent terminal 34.

Figure 4:
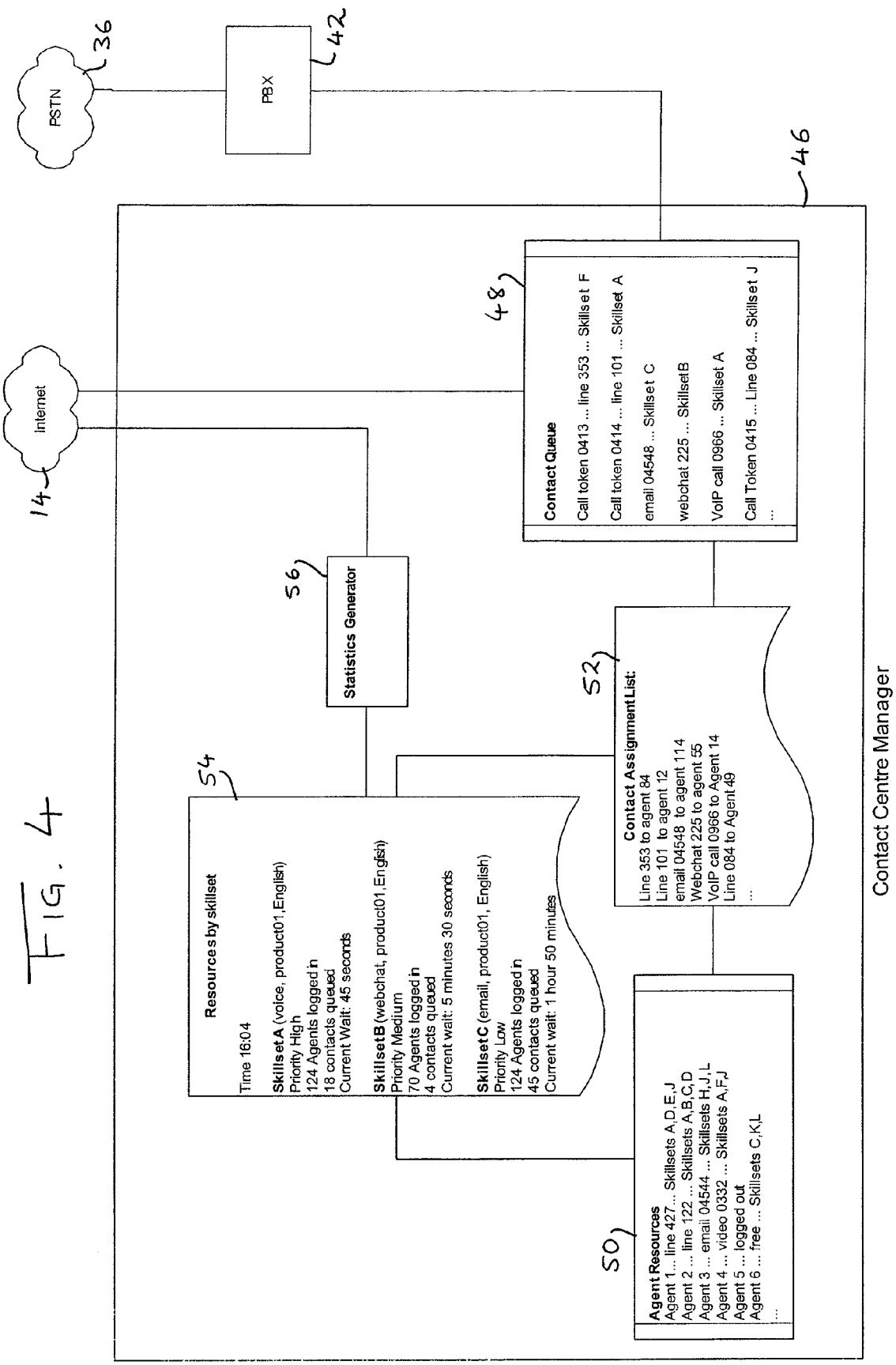
FIG. 4 is a block diagram illustrating the processes operating in a contact centre management unit.

FIG. 4 illustrates the processes operating in contact centre manager 46. In addition to calls held at PBX 42, the contact centre manager 46 also queues contacts which arrive over the Internet such as e-mails, web chat sessions, video calls and voice over internet protocol (VoIP) calls. The contacts which arrive over the Internet have a skillset determined by the link which was activated by the user to initiate the contact. The contacts from the Internet and the contacts from the PBX are represented by tokens placed in a contact queue 48. Each of the agents at the contact centre is represented in an agent resource file 50 which records the current activity of the agent and the skillsets which the agent possesses. Thus, it can be seen agents and 1 and 2 are currently engaged in telephone calls originating from lines 427 and 122, respectively, whereas agent 3 is currently responding to an email designated as number 04544.

The agent resources 50 and the contact queue 48 are reconciled using a contact assignment list 52. In contact assignment list 52, the contact centre manager 46 decides the agents to which the contacts in the queue should be assigned based on the skillset requirements of the contact and the availability of the agent. It can be seen that the call represented by call token 0413 at the top of the queue 48 has been assigned to agent 84. When agent 84 becomes free, the PBX 42 will be instructed to direct the call terminated at line 353 to agent terminal 84. Call token 0413 will then be deleted from the contact queue and the agent resources for agent 84 will be updated accordingly. Alternatively, the contact assignment list can be updated based on notifications of agent availability rather than pre-allocating agents to contacts.

In addition, the contact centre manager 46 maintains a list of available resources 54 categorised by skillset. Thus, it can be seen that skillset A (which relates to voice calls in English about "product01") has 124 agents possessing this skillset logged in, and 18 contacts categorised under the skillset are currently in the contact queue 48. Skillset B, which relates to the same product and language, has only 70 agents logged in (for example, because not all agents have the necessary software to conduct web chat sessions, or are not all of the agents have been trained in web chat procedures). Skillset C is again the same product and language, but relates to the email medium. This has the same group of agents as skillset A, but has 45 contacts queued. Each skillset has a different priority rating and the priority rating is used when moving contacts within the contact queue 48. Thus, voice calls will be promoted quicker than e-mails (alternatively, different queues could be maintained for different contacts types, with voice calls being assigned to agents more frequently than e-mails). Depending on the priority rating, number of agents active, and number of contacts queued, each skillset will have a current wait time, which is the expected wait for new contacts in that skillset.

A statistics generator 56 is available to generate statistics and transmit them over the Internet in a predetermined format. Such statistics provide a summary of the availability of the contact centre to deal with new contacts, taking into account the current loads from both the Internet 14 and the PSTN 36.

Figure 5:
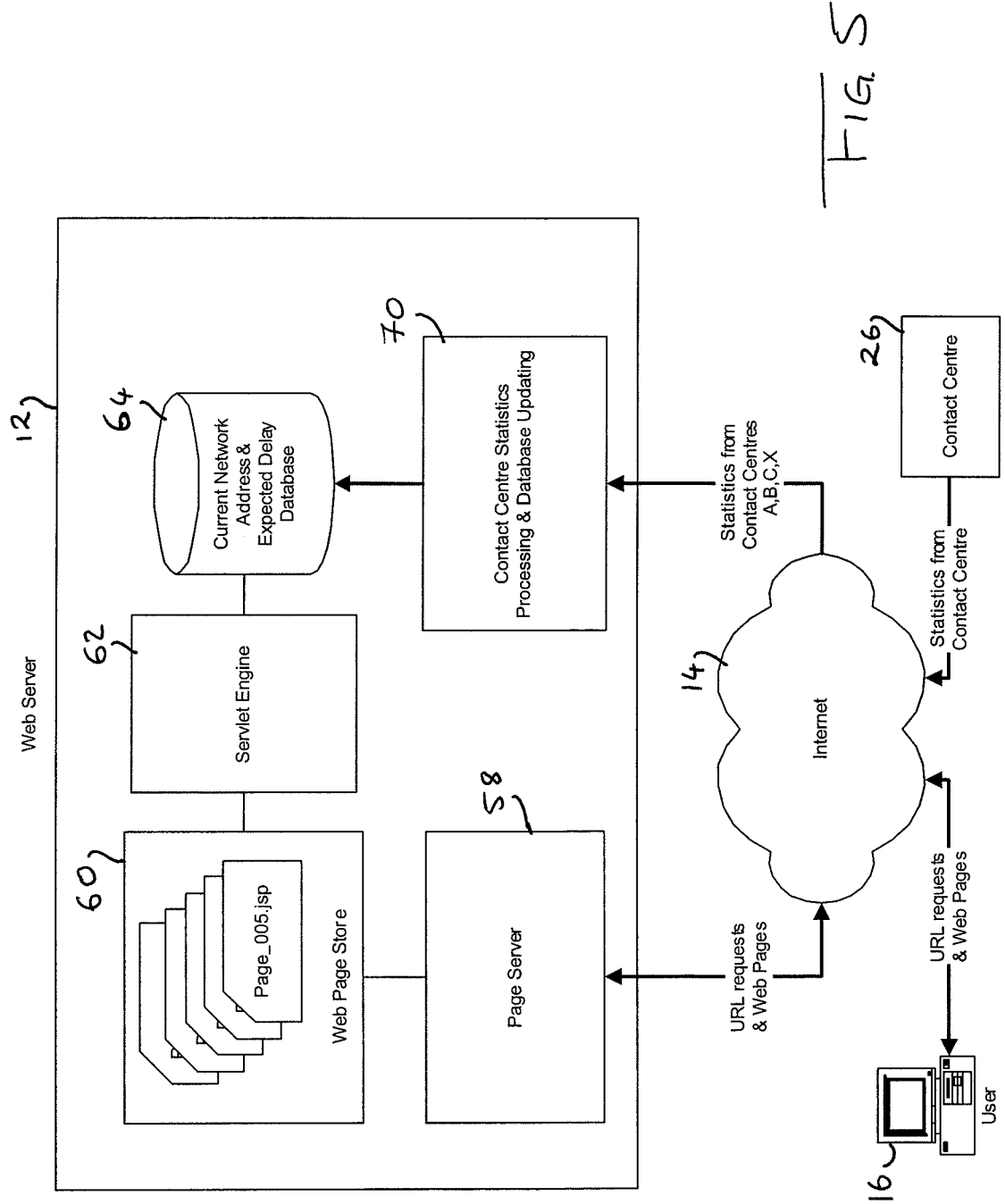
FIG. 5 is an architecture showing the operation of the web server within the network.

Referring now to FIG. 5, the web server 12 can be seen connected to the Internet 14, with a representative user PC 16 and representative contact centre 26 also connected to the Internet as previously described. In the manner previously described, the user submits URL requests to the web server 12 and web server 12 responds by transmitting HTML code corresponding to web pages back to the user 16 via the Internet 14. When a web page such as web page 10 is requested in this way, a page server 58 locates the page requested in a web page store 60. The pages are not static HTML pages but are dynamic pages stored in Java™ server pages (JSP) format.

As is well known in the programming arts, when a JSP page is requested, code embedded within the page is run on a servlet engine 62 which outputs HTML code to the page server 58 for transmission to the user 16. Similar results can be achieved using common gateway interface (CGI) scripts, application server pages (ASP), and equivalent technology. In the case of web page 10, the code specifies that the user is to be shown the text and graphical elements illustrated in FIG. 1. Among these text elements are the five links indicated generally at 24. Taking the link having text "telephone (internet telephony required)" as an example, clicking this link initiates an Internet phone call from the internet telephony software on the user's PC to a predetermined IP address which is specified within the link. The IP address is determined dynamically by the servlet engine 62 with reference to a database 64. The contents of the database 64 are updated based on statistics received from contact centre 26 and the other contact centres shown in FIG. 2.

Each contact centre supplies statistics records, the contents of which are illustrated in FIG. 6. Each statistics record 66 includes an email address and an IP address for the contact centre as well as a number of sub-records 68 which detail the response times in hours, minutes and seconds for each link on the web page. For example, contact centre X has a sub-file 68' relating to English language support for the "Home Office" laptop product, in which there is detailed an expected response time of 25 minutes for forms, one minute and 20 seconds for web chat sessions, 40 minutes for e-mails and 30 seconds for voice calls. Contact Centre X does not support video calls at all, and thus in each record 68 an indication has been given that video calls are not supported.

Another record 68" details the response times for the "Enterprise" desktop product in the Japanese language. Because none of the agents at Contact Centre X is sufficiently proficient in Japanese to conduct voice calls or to participate in web chat sessions in Japanese, these activities are also indicated to be "not supported". A single agent is sufficiently proficient to respond in Japanese to forms and the emails, but as these are "low priority" skillsets in Contact Centre X, a response time of 2 hours is indicated.

More than a single email address and a single IP address can be provided. For example, each skillset might be associated with an individual email address or IP address, which can be recorded in the statistics sent to the web server. In this way, the database could be updated with the address of an individual agent or a group of agents within a contact centre, removing the need for the contact centre to process the contact upon arrival.

The statistics records 66 are processed in a processing and updating unit 70 (FIG. 5) which populates and updates the Current Network Address and Expected Delay Database 64. The contents of the database 64 are illustrated in FIG. 7. The database contains a record for each support page on the website, and lists in each record the respective addresses associated with the links on the page. Thus, comparing FIGS. 1,6 and 7 it can be seen that when the option to "email" is clicked, the email address returned to the user's PC will be "XYZagents@FreelanceCCX.com". The "email" link activates a "mailto" activity such that when the user's browser is integrated with the user's email program, a blank mail message is generated with the specified address in the "to" field (and optionally, a suitable heading in the subject line, such as "Home Office English technical support question"). Similarly, clicking "live video call" will result in a video call being initiated from the user's PC 16 to the IP address specified for "Home Office English" video chat, namely 140.11.0.0. It can be seen that the email address for this product and language is that of Contact Centre X whereas the video IP address is that of Contact Centre A.

Figure 8:
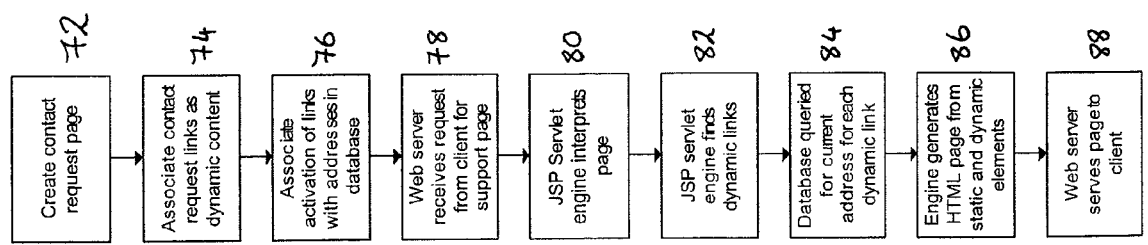
FIG. 8 is a flowchart detailing the steps in providing a web page to a user.

FIG. 8 shows the process in providing a page to a user. A contact request page is created in step 72. In this page, contact request links are encoded as having dynamic content, step 74. The activation of links on the contact page is associated with particular addresses in the database 64, step 76. Thus, the video call link on web page 10 is not directly associated with the IP address 140.11.0.0; rather it is associated with the appropriate record address in the database 64, the contents of which may be changed over time.

When a user navigates to web page 10 this will normally be done by clicking a link on another page or frame on the site. This result in a URL request being sent to the web server which is received in step 78. The JSP servlet engine interprets the page, step 80 and in doing so notes the dynamic links for the contact request links 24, step 82. The database 64 is queried for the current address associated with each of the dynamic links, step 84 and when these are retrieved, the engine generates a HTML page from the static links stored in the web page store and the dynamic elements retrieved from the database (and optionally, from other locations), step 86. This HTML code is provided to the web server which serves it as a web page to the client, step 88.

The database is maintained in the following manner, illustrated in FIG. 9A. Initially, the database is populated with default contact addresses, step 90. This might be done by selecting the largest of the call centres, or the call centre which is most often on-line, and using the addresses (email address, IP address, etc.) of that contact centre in each field of the table. Alternatively, different contact centres can be initially selected for different fields of the table, i.e. one contact centre might specialise in video calls in English and French, another might specialise in Japanese communications of all types, and the appropriate addresses for the contact centres would then be entered in the appropriate records in the database.

The database is also populated, step 92, with initial delay times. The purpose of these delay times is to provide a time which can be compared against the real delay times in the statistic records 66 received from the contact centres. When a contact centre indicates that it has a better (lower) delay time than the default time initially populated, then the database will be updated with a new contact address so that communications are sent to the centre with the best availability.

The processing and updating unit 70 monitors for statistical sets (statistic records 66) from the nodes (contact centres), step 96. When a statistic set is received in step 96, it is processed according to FIG. 9B, while the main process reverts to step 94, monitoring for farther statistic sets.

At this point, it should be noted that the statistics generator 56 (FIG. 4) processes the information in the skillset resource file 54 and convert this to an output having a format expected by the processing and database updating unit 70. Thus, the individual response time entries in the sub-records 68 are determined by a concordance maintained by the statistics generator between the product descriptions in the skillset resource record (e.g. product01) and the product descriptions expected by the web server (e.g. Traveller French).

Figure 9B:
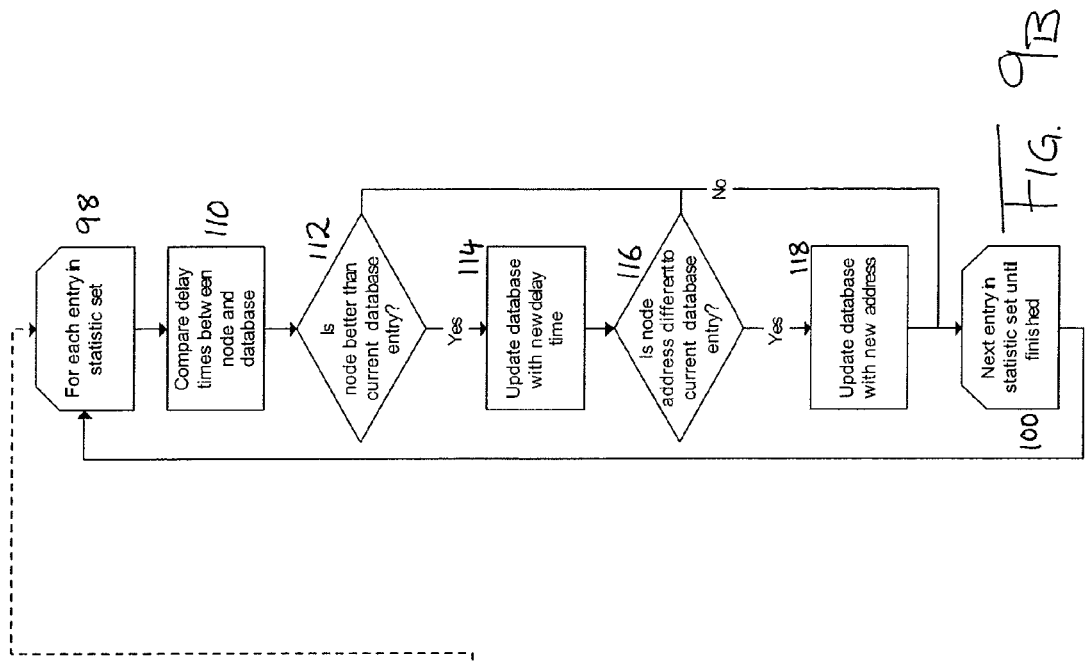
FIGS. 9A and 9B form a flowchart detailing the population and maintenance of the network address database.
Figure 9A:
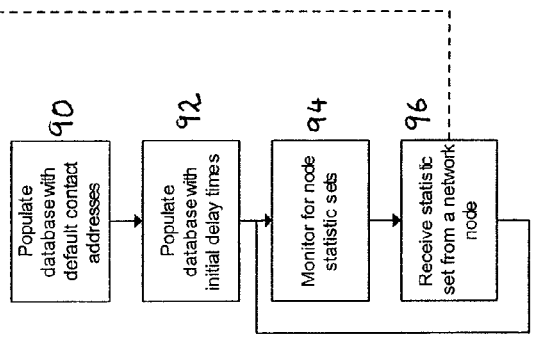

In FIG. 9B, the statistics file 66 is processed, entry by entry in a loop between steps 98 and 100 until all of the entries have been processed. For each entry, the delay time recorded by the contact centre (e.g. the delay time of 40 minutes for responses to emails in English relating to the "Home Office" laptop) is compared to the corresponding entry in the database, FIG. 7. (In the illustrated example, Contact Centre X is already recorded in the database as being the best email address for this skillset, with a response time of 40 minutes.) If the statistic set record shows a better response time than that currently in the database, decision 112, then the database is updated with the new delay time from the statistic set, step 114. Otherwise, the process moves to step 100.

In decision 116, it is then determined if the node address in the statistics file is different to that in the database for the same contact type, language and product. If not, and the process proceeds to step 100. If, however, the node address is different, the database entry is updated with the new address, taken from the statistic files 66.

To demonstrate how this would work in practice, let us assume, for example, that the statistics from Contact Centre X indicate that the expected response time for web chat sessions in French relating to the "Traveller" product is now three minutes and 50 seconds. In step 110 this time (0:03:50) is compared to the time recorded in the database (FIG. 7) and it is noted that this expected delay is better than the current recorded delay time of 0:04:20 (when web chat sessions are directed to IP address 111.234.90.0 (Contact Centre C)). The database is therefore updated with the new time of 0:03:50, step 114, and it is next noted in decision 116 that the IP address of Contact Centre X (207.123.21.0) is not the same as that currently recorded for French web chat sessions relating to the "Traveller" product and therefore, the IP address is updated as well, step 118.

The effect of this change to both the delay time and the IP address is that if a user clicks on the web chat option in the French "Traveller" support page, a web chat session will be initiated, from this point onwards, to Contact Centre X, rather than to Contact Centre C as before. The other effect of this change is that only when another contact centre has a lower delay time will the database be updated with a new address.

In practice, a further check can be built into the loop of FIG. 9B: when a statistic set is received from a contact centre having one or more entries in the database, the current delay times in the statistic set are compared with those recorded in the database to ensure that times have not lengthened. Where a delay time has lengthened, this new longer time is recorded, increasing the possibility that another contact centre will have a better current delay time, leading to a further change of address.

By comparing corresponding statistics from the various contact centres in the network, the most appropriate contact centre for any particular skillset and contact type can be determined and recorded in the database. Then, instead of processing each contact request separately after it has entered the network of contact centres, the routing for different contact types and skillsets can be set up in advance by associating the various addresses appropriate to different contact types and skillsets with links on the contact page.

Figure 10:
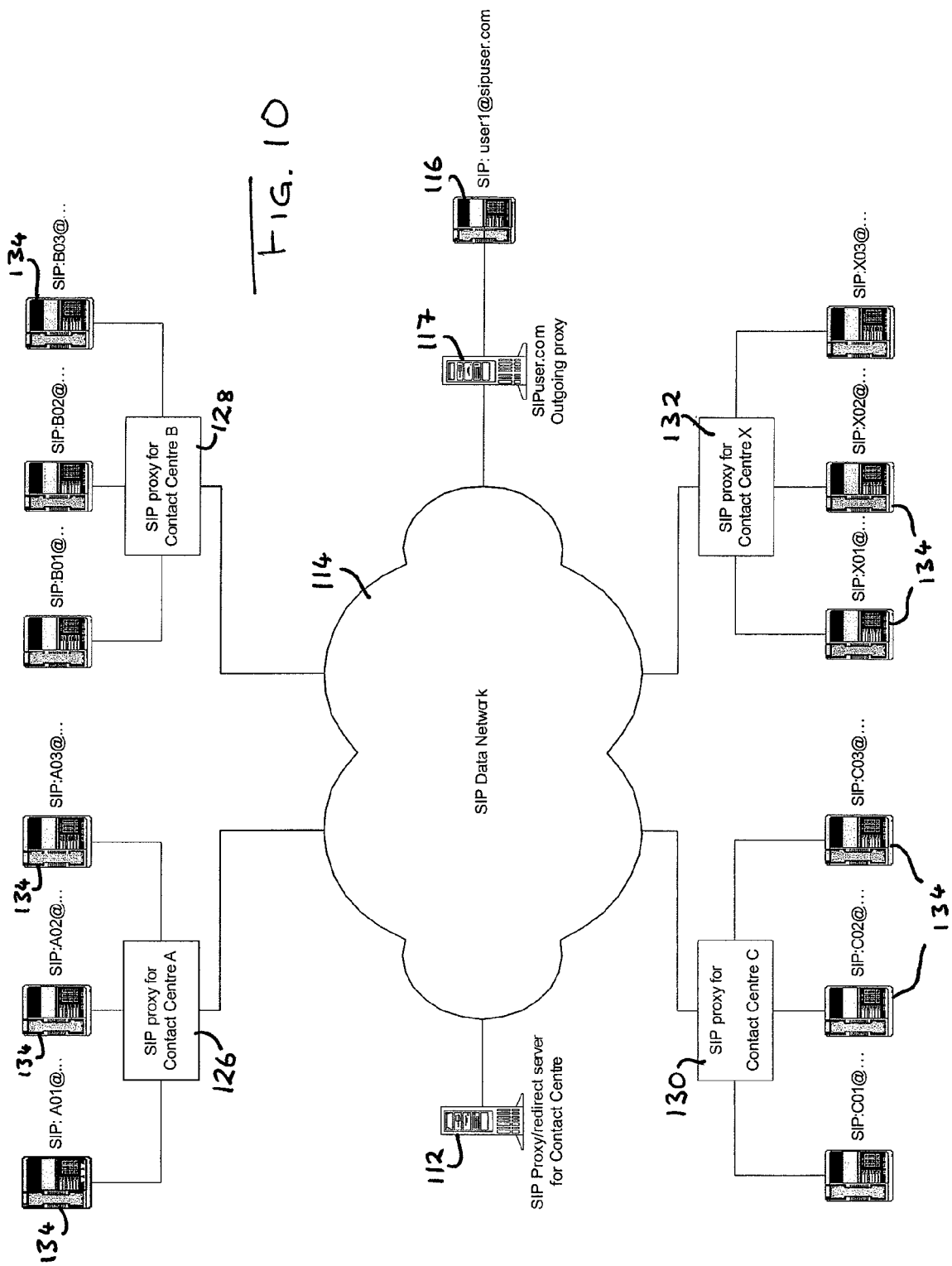
FIG. 10 shows the architecture of a network of contact centres.

In another embodiment, shown in FIG. 10, a plurality of agent stations 134 are each connected to a data network 114 via one of a number of session initiation protocol (SIP) proxy servers 126, 128, 130, 132. SIP is a protocol for setting up, administering and tearing down VoIP calls and other multimedia conferences. In the protocol, a proxy server receives a request from a user to contact a remote user, and the proxy server forwards the request either to the local server for that remote user (if known) or to another server on the network which in turn tries to locate the remote user's server. Once a request has been accepted, the call is set up directly between the respective proxy servers.

In the architecture of FIG. 10, the four proxy servers 126, 128, 130, 132 of the respective contact centres each communicate statistical records (as in the previous embodiments) to a SIP proxy/redirect server 112 for the contact centre network. This server, like web server 112 of the previous embodiments, maintains a current network address database which may be populated, updated and maintained in the manner already described. For SIP-based calls, the network address of each agent can be specified as a URI in the form "SIP:A01@xyztechsupp.com", and it is these addresses which the database records for individual skillsets (e.g. by recording for each skillset the SIP address of the agent having the necessary skillset and the longest idle time).

A SIP-enabled user wishing to contact technical support by telephone, video, text messaging or any other SIP-enabled technology may do so in a number of ways. For example, a SIP call can be initiated from a telephone by consulting a directory or website to determine the telephone number for the relevant service. Taking the previous example, if the user wishes to access English technical support for the "Home Office" laptop, the webpage may provide a dedicated telephone number. When the user at a telephone 116, who has the identity "SIP:user01@sipuser.com" and obtains SIP access from the domain SIPuser.com dials the number provided on the webpage, the number is resolved to a SIP address in the SIPuser.com proxy server 117. However, proxy 117 does this on the basis of a URI cache which has been updated from the database maintained in the proxy/redirect server 112 (the information can be updated periodically on request from server 117 or on the instruction of server 112, or it can be done every time there is a change in the contents of the database, for example).

Thus, the fixed contact number on the webpage for the requested service is resolved dynamically to a SIP address for the most suitable agent. Assuming this is agent A03, for example, this means that when the user dials the fixed number, SIPuser.com proxy server 117 will consult the cache, resolve this to the address "SIP:A03@XYZtechsupp.com" and initiate a call directly from the user to the agent, without the necessity of the call entering a queue for analysis.

The invention is not limited to the specific embodiments described herein which may be varied or departed from within the spirit and scope of the invention as defined in the appended claims.

What is claimed is:

1. A method of routing contacts in a network having a plurality of discrete contact centres, the method comprising the steps of:
   a) providing a uniform resource indicator (URI), accessible by a plurality of users of the contact centre network, said URI being, in advance of its activation by a user, a network address of a resource of the network of contact centres, such that when said URI is activated by a user a contact is forwarded to said resource;
   b) maintaining a record of said contact centre network address of said resource to which said contact should be forwarded;
   c) updating said record in accordance with information received from said contact centres; and
   d) updating said URI over time to dynamically point to a particular resource of one of the contact centres based on the current state of said record such that individual contacts are directed to a particular contact centre as they arrive in said contact centre network.

2. A method as claimed in claim 1, wherein said URI is a web-based link.

3. A method as claimed in claim 2, wherein said web-based link is provided on a web page.

4. A method as claimed in claim 3, wherein said web page includes a plurality of links, each initiating a contact having individual characteristics to the network of contact centres when activated by a user.

5. A method as claimed in claim 4, wherein step b) comprises maintaining a plurality of records each specifying an address of a contact centre to which one or more of said contact types is to be sent.

6. A method as claimed in claim 5, wherein step c) comprises receiving information from a plurality of contact centres relating to the current status of each contact centre and updating said records with the addresses of the contact centres having the optimum status for receiving the respective contact types according to a predetermined rule.

7. A method as claimed in claim 2, wherein said URI is a dynamic link which is evaluated when the link is activated to determine the current properties of said record.

8. A method as claimed in claim 7, wherein the link is activated by a user submitting a web-based form or activating a chat session.

9. A method as claimed in claim 8, wherein said link is evaluated using common gateway interface (CGI) scripts, application server pages (ASP) code, or Java™ server pages (JSP) code.

10. A method as claimed in claim 3, wherein a plurality of web pages is provided each having one or more links with individual characteristics, and wherein step b) comprises maintaining a plurality of records of contact centre addresses each associated with one or more of said links.

11. A method as claimed in claim 1, wherein said contact is an e-mail message, and said network address is an email address to which the email is sent.

12. A method as claimed in claim 1, wherein said contact is a voice over internet protocol (VoIP) call or an internet video call, and said address is an IP address to which the call is initially directed.

13. A method as claimed in claim 1, wherein said contact is a form, and said network address is an email address to which the contents of the form are sent.

14. A method as claimed in claim 1, wherein said contact is a web chat request, and said network address is an IP address to which said request is initially directed.

15. A method as claimed in claim 1, wherein step c) comprises comparing a performance parameter received from a contact centre with a corresponding parameter currently recorded in said record, and based on this comparison, updating the record according to a predetermined rule.

16. A method as claimed in claim 15, wherein said performance parameter is an expected response time, and wherein said rule dictates updating the record if the expected response time received from the contact centre is lower than a currently recorded response time in the record.

17. A method as claimed in claim 15, wherein said performance parameter is a longest idle time for one or more agents at the contact centre, and wherein said rule dictates updating the record if the longest idle time received from the contact centre is lower than a currently recorded longest idle time in the record.

18. A method as claimed in claim 1, wherein step c) comprises receiving statistical information from a plurality of contact centres and updating said record with an address of a contact centre having optimum statistical information according to a predetermined rule.

19. A method as claimed in claim 1, wherein said record is maintained in a cache in a proxy server remote from the contact centre and said step of updating said record is achieved by a server associated with the contact centre updating the proxy server.

20. A method as claimed in claim 1, wherein said URI is a session initiation protocol (SIP) URI.

21. A method as claimed in claim 20, wherein said record is maintained in a cache in a proxy server remote from the contact centre and said step of updating said record is achieved by a server associated with the contact centre updating the proxy server.

22. A session initiation protocol (SIP) proxy server providing access to a network of a plurality of discrete contact centres via a data network, said proxy server including a cache for storing one or more Uniform Resource Indicators (URIs) each being, in advance of its activation, a network address of a contact centre resource, and a cache management unit for dynamically updating said cache in accordance with current information made available to the proxy server by a management server of the contact centre network, whereby contact requests received by the proxy server are resolved with reference to said cache for automatic direction to a dynamically updated network address determined in advance by said management server such that individual contacts are directed to a particular contact centre as they arrive in said contact centre network.

23. A contact centre network comprising a plurality of discrete contact centres and a web server communicating with said contact centres via a data network accessible by a plurality of users of said contact centres, wherein:
   each contact centre comprises
      a) a plurality of agent stations adapted to receive and respond to contacts received via the data network;
      b) a contact centre management unit for managing the distribution of contacts to said agent stations; and
      c) a statistics processing unit for determining performance parameters of the contact centre as a whole and/or individual agent stations within the centre and for forwarding information derived from said parameters to said web server;
   and
   said web server comprises:
      a) a page server unit for receiving web page requests from users of the contact centres and serving web pages to said users in response to said requests;
      b) a web page store for storing said web pages as dynamically evaluated code;
      c) a processing unit for dynamically evaluating said code when a web page request is received by the page server unit and returning to the page server unit the results of said evaluation, said evaluation including the determination of at least one network address of a contact centre resource associated with a link on said page, whereby said link is, in advance of its activation by a user, said at least one a network address of a contact centre resource;
      d) a memory accessible by said processing unit for storing said at least one network address of a contact centre resource; and
      e) a memory management unit for maintaining and updating the at least one network address of a contact centre resource in said memory in accordance with the information received from the statistics processing units of said contact centres such that individual contacts are directed to a particular contact centre as they arrive in said contact centre network.

24. A computer program product comprising instructions which when executed in a web server are effective to:
   a) provide a web-based link accessible by a plurality of users of the contact centre network, said link being, in advance of its activation by a user, a network address of a resource of the network of contact centres, such that when said link is activated by a user a contact is forwarded to said resource;
   b) maintain a record of a contact centre network address of said resource to which said contact should be forwarded;
   c) update said record in accordance with information received from said contact centres; updating said URI over time to dynamically point to a particular resource of one of the contact centres based on the current state of said record such that individual contacts are directed to a particular contact centre as they arrive in said contact centre network.

* * * * *

UNITED STATES PATENT AND TRADEMARK OFFICE
CERTIFICATE OF CORRECTION

| | | |
|---|---|---|
| PATENT NO. | : 8,934,477 B2 | Page 1 of 1 |
| APPLICATION NO. | : 12/417334 | |
| DATED | : January 13, 2015 | |
| INVENTOR(S) | : Tony McCormack et al. | |

It is certified that error appears in the above-identified patent and that said Letters Patent is hereby corrected as shown below:

In the Specification

Column 1, under "RELATED APPLICATION", line 6, "Sept. 18, 2002" should read,
-- Dec. 18, 2002 --.

Signed and Sealed this
Twenty-eighth Day of July, 2015

Michelle K. Lee
*Director of the United States Patent and Trademark Office*